US011431241B2

(12) United States Patent
Hensler et al.

(10) Patent No.: US 11,431,241 B2
(45) Date of Patent: Aug. 30, 2022

(54) FREQUENCY CONVERTER WITH SIMPLIFIED PRE-CHARGING CIRCUIT

(71) Applicant: SIEMENS AKTIENGESELLSCHAFT, Munich (DE)

(72) Inventors: Alexander Hensler, Gerhardshofen (DE); Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/290,036

(22) PCT Filed: Sep. 19, 2019

(86) PCT No.: PCT/EP2019/075110
§ 371 (c)(1),
(2) Date: Apr. 29, 2021

(87) PCT Pub. No.: WO2020/088839
PCT Pub. Date: May 7, 2020

(65) Prior Publication Data
US 2021/0408931 A1    Dec. 30, 2021

(30) Foreign Application Priority Data

Oct. 30, 2018   (EP) .................................. 18203374

(51) Int. Cl.
*H02M 1/36* (2007.01)
*H02M 5/458* (2006.01)
(Continued)

(52) U.S. Cl.
CPC ........... *H02M 1/36* (2013.01); *H02M 5/4585* (2013.01); *H02M 7/219* (2013.01);
(Continued)

(58) Field of Classification Search
CPC .... H02M 1/0064; H02M 1/36; H02M 5/4585; H02M 7/05; H02M 7/062; H02M 7/2173; H02M 7/219
See application file for complete search history.

(56) References Cited

U.S. PATENT DOCUMENTS 9,673,695 B1 * 6/2017 Li ........................... H02M 1/32
9,837,924 B1 * 12/2017 Wei ...................... H02M 7/125
(Continued)

FOREIGN PATENT DOCUMENTS

EP    2533409 A1    12/2012

OTHER PUBLICATIONS

Dehghani Tafit Hossein et al: "Control of active front-end rectifier of the solid-state transformer with improved dynamic performance during precharging", 2017 Asian Conference of Energy, Power and Transportation Electrification (ACEPT), IEEE, pp. 1-6, XP033263691, DOI: 10.1109/ACEPT.2017.8168622; [found Dec. 5, 2017]; 2017.
(Continued)

*Primary Examiner* — Jue Zhang
(74) *Attorney, Agent, or Firm* — Henry M. Feiereisen LLC

(57) ABSTRACT

A frequency converter with a rectifier on an input side and a backup capacitor arranged downstream of the rectifier. Input-side phases of the rectifier feed the backup capacitor via multiple half-bridges of the rectifier. The input-side phases are connected to grid-side phases of a multiphase supply grid via a pre-circuit. Each grid-side phase is connected to an input-side phase within the pre-circuit via a phase capacitor. Each grid-side phase is additionally directly connected to another input-side phase within the pre-circuit via a switch and the grid-side phases are short-circuited with the input-side phases when the switches are closed. Each phase capacitor connects two grid-side phases or two input- (Continued)

side phases together. The frequency converter has a control apparatus which keeps the switches open when pre-charging the backup capacitor and closes the switches when a specified charge state of the backup capacitor is reached.

6 Claims, 4 Drawing Sheets

(51) Int. Cl.
*H02M 7/217* (2006.01)
*H02M 7/219* (2006.01)
*H02M 7/04* (2006.01)
*H02M 7/06* (2006.01)
*H02M 1/00* (2006.01)

(52) U.S. Cl.
CPC ........ *H02M 7/2173* (2013.01); *H02M 1/0064* (2021.05); *H02M 7/05* (2021.05); *H02M 7/062* (2013.01)

(56) References Cited

U.S. PATENT DOCUMENTS

| | | | | |
|---|---|---|---|---|
| 2013/0119903 A1* | 5/2013 | Weiss | ............ | H02H 9/001 |
| | | | | 318/400.3 |
| 2013/0241451 A1* | 9/2013 | Wei | ............ | H02M 7/125 |
| | | | | 318/400.3 |
| 2014/0117910 A1* | 5/2014 | Le | ............ | G01R 31/42 |
| | | | | 318/490 |
| 2015/0098257 A1* | 4/2015 | Wei | ............ | H05K 7/1432 |
| | | | | 363/37 |

OTHER PUBLICATIONS

PCT International Search Report and Written Opinion of the International Searching Authority dated Jan. 8, 2020 corresponding to PCT International Application No. PCT/EP2019/075110 filed Sep. 19, 2019.

* cited by examiner

FREQUENCY CONVERTER WITH SIMPLIFIED PRE-CHARGING CIRCUIT

CROSS-REFERENCES TO RELATED APPLICATIONS

This application is the U.S. National Stage of International Application No. PCT/EP20191075110, filed Sep. 19, 2019, which designated the United States and has been published as International Publication No. WO 2020/088839 A1 and which claims the priority of European Patent Application, Serial No. 18203374.6, filed Oct. 30, 2018, pursuant to 35 U.S.C. 119(a)-(d).

BACKGROUND OF THE INVENTION

The present invention relates to a frequency converter,
wherein the frequency converter has a rectifier on the input side and at least one backup capacitor arranged downstream of the rectifier,
wherein the rectifier has a plurality of half-bridges by means of which each input-side phase of the rectifier feeds the backup capacitor,
wherein the input-side phases of the rectifier are connected via a pre-circuit to grid-side phases of a multi-phase supply network,
wherein the grid-side phases are each connected within the pre-circuit via a respective phase capacitor to one of the input-side phases.

Grid-fed frequency converters typically require both a filter circuit and also a pre-charging circuit between the supply network and the input-side rectifier of the frequency converter. The filter circuit serves to limit grid pollution. The pre-charging circuit is needed only during connection of the frequency converter to the supply network. It serves to limit the pre-charging current with which the backup capacitor is charged. As soon as the backup capacitor is charged, the current limitation can be ended. For this purpose, the pre-charging circuit can be ridged, for example, by means of a relay.

A simple and widely used pre-charging circuit consists of arranging a resistor in each line from the grid-side phases of the supply network to the input-side phases of the rectifier, which after the pre-charging of the backup capacitor is bridged by means of a switching contact of a relay. This pre-charging circuit has the disadvantage that on pre-charging, high power losses arise in the resistors and thus a significant heating of the resistors occurs. Particularly in cases in which the capacitance of the backup capacitor is large, the resistors must also be designed to be voluminous. Alternatively, the resistance values can also be selected to be relatively large. In this case, however, the time needed for pre-charging increases. Furthermore, a repeated pre-charging is often only possible to a limited extent, since the resistors need a relatively long time to cool down again.

Alternatively, it is known, for pre-charging the backup capacitor, to use dedicated power semiconductors. This process, however, involves complex and costly circuit design.

From EP 2 533 409 A1, there are known a plurality of frequency converters of the type mentioned in the introduction. In one of these frequency converters, the grid-side phases are each further directly connected via a respective switch to the same respective input-side phase, so that with the switches closed, the grid-side phases are short-circuited to the same input-side phases and the phase capacitors are therefore bridged and are thus inactive. In another of these frequency converters, firstly further capacitors are arranged in the conducting paths in which the switches are arranged. Furthermore, in the conducting paths in which the phase capacitors are arranged, further switches are provided. The further switches are opened when the above-mentioned switches are closed, and vice versa.

The frequency converters known from EP 2 533 409 A1 are advantageous over the frequency converters of the conventional prior art since during pre-charging, only slight power losses arise. However, the total volume is still large because both the pre-charging circuit and also the filter circuit are needed. The costs are accordingly also still high.

From the specialist paper "Control of Active Front-End Rectifier of the Solid-State Transformer with Improved Dynamic Performance during Recharging" by H. D. Tafti et al., a frequency converter is known which has a rectifier on the input side and a backup capacitor arranged downstream of the rectifier. The rectifier has half-bridges by means of which input-side phases of the rectifier feed the backup capacitor. The half-bridges have active switching elements so that the rectifier is configured as a feedback-capable converter. The input-side phases of the rectifier are connected via a pre-circuit to the grid-side phases of a supply network. The frequency converter has a control apparatus which actuates the active switching elements when a first charging state of the backup capacitor is reached so that the backup capacitor is further charged at a constant charging rate.

It is an object of the present invention to design a frequency converter of the type mentioned in the introduction such that both the filter function and also the current limitation are realized during pre-charging, but the associated pre-circuit is realizable easily and inexpensively.

SUMMARY OF THE INVENTION

The object is achieved with a frequency converter as set forth hereinafter. Advantageous embodiments of the frequency converter are the subject matter of dependent claims.

According to the invention, a frequency converter of the type mentioned in the introduction is configured in such a way
that the grid-side phases are each further directly connected within the pre-circuit via a respective switch to a different input-side phase, so that with the switches closed, the grid-side phases are short-circuited to the input-side phases and the phase capacitors each connect two grid-side phases and/or two input-side phases to one another, and
that the frequency converter has a control apparatus which keeps the switches open during pre-charging of the backup capacitor and when a pre-determined first charging state of the backup capacitor is reached, closes them.

It can be achieved thereby that the same capacitors—specifically the phase capacitors—firstly, bring about the current limitation during pre-charging and secondly, act during normal operation as filter capacitors of the current filtration.

The exchange of the grid-side and input-side phases that are connected to one another does not present a great problem. In a non-controllable rectifier, no measures are required in any case. In a controlled rectifier (that is, a rectifier in which the half-bridges have active switching elements), the actuation of the active switching elements can easily be adapted accordingly by means of the control apparatus. In particular, only the assignment of the individual control signals must be adapted to the active switching elements. The actuation as such can be retained unchanged.

Preferably, the pre-circuit has inductors in lines to the grid-side phases and/or to the input-side phases. By means of this embodiment, a particularly simple and effective filtration can be brought about.

Preferably, the inductors are arranged in the lines such that phase currents fed in from the supply network and/or via the half-bridges flow through them both with the switches open and with the switches closed. By this means, the implementation of the combination of the two effects of the phase capacitors—specifically once for filtration and once for current limitation—are particularly simple and effective.

The half-bridges preferably have active switching elements so that the rectifier is configured as a feedback-capable converter. This embodiment has advantages, in particular, from the standpoint of energy technology. It also offers further advantages.

For example, in this case it is possible that the control apparatus, when the pre-determined first charging state is reached, firstly actuates the active switching elements such that input-side phase voltages which correspond in amplitude and phase to the grid-side phase voltages that exist on the grid-side phases to which the input-side phases are connected via the phase capacitors are applied via the active switching elements to the input-side phases, then actuates the active switching elements such that the input-side phase voltages which are applied via the active switching elements to the input-side phases are always transformed into the grid-side phase voltages which exist on the grid-side phases to which the input-side phases are connected via the switches, and closes the switches only after the transformation of the input-side phase voltages into the grid-side phase voltages which exist on the grid-side phases to which the input-side phases are connected via the switches.

It is thereby possible significantly to reduce current spikes and voltage jumps which otherwise can occur on closing the switches.

Furthermore, in the case of active switching elements, it is possible that, after reaching a second charging state of the backup capacitor that is attained during the pre-charging of the backup capacitor before the first charging state, the control apparatus actuates the active switching elements such that by means of the active switching elements, applied to the input-side phases are input-side phase voltages which vary antiphase to the grid-side phase voltages that exist on the grid-side phases to which the input-side phases are connected via the phase capacitors. With this embodiment, the pre-charging time can be significantly reduced.

BRIEF DESCRIPTION OF THE DRAWING

The above-described properties, features and advantages of this invention and the manner in which they are achieved are made more clearly and distinctly intelligible with the following description of the exemplary embodiments which are described in greater detail making reference to the drawings. In the drawings, in schematic representation.

DETAILED DESCRIPTION OF PREFERRED EMBODIMENTS

Figure 1:
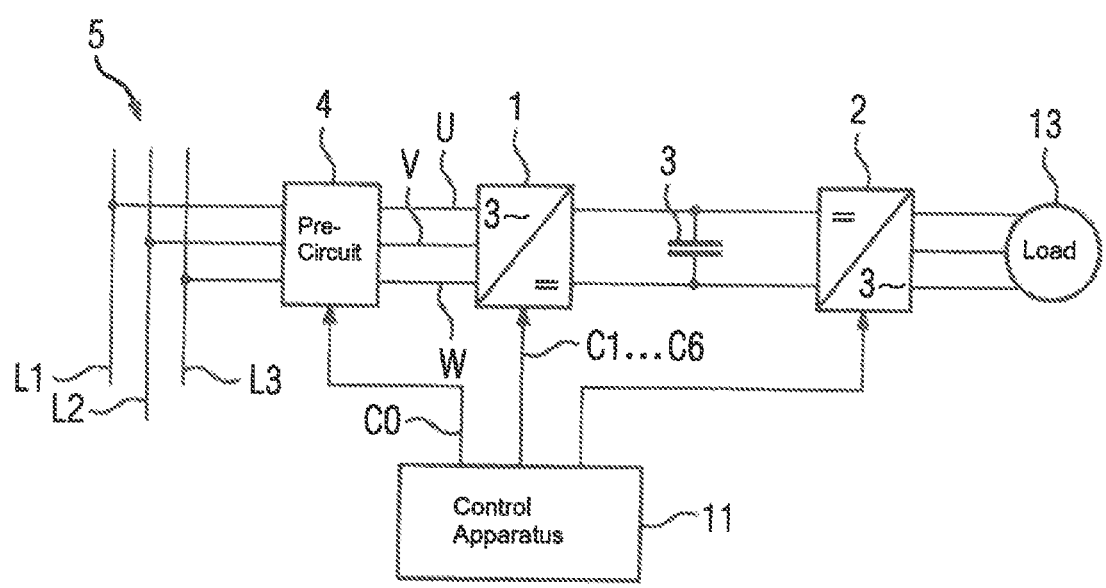
FIG. 1 is a frequency converter.

According to FIG. 1, a frequency converter has an input-side rectifier 1. A further apparatus 2 is arranged on the output side of the rectifier 1. The frequency converter further has at least one backup capacitor 3 which is arranged between the rectifier 1 and the further apparatus 2. The further apparatus is often configured as an inverter. In this case, this is known as an indirect converter. The further apparatus, however, can be configured differently, for example, as a DC consumer, as a DC network, as a photovoltaic system or as an energy store.

The rectifier 1 has input-side phases U, V, W which are connected via a pre-circuit 4 to phases L1, L2, L3 of a supply network 5. Both the rectifier 1 and also the supply network 5 are thus multiphase and thus each have a plurality of phases U, V, W or L1, L2, L3. The phases U, V, W of the rectifier 1 are identified below for linguistic differentiation from the phases L1, L2, L3 of the supply network 5 as input-side phases U, V, W. Similarly, for linguistic differentiation from the input-side phases U, V, W of the rectifier 1, the phases L1, L2, L3 of the supply network 5 are identified as grid-side phases L1, L2, L3.

The number of input-side phases U, V, W is typically three. Independently of the number of input-side phases U, V, W, however, the number of input-side phases U, V, W is equal to the number of grid-side phases L1, L2, L3.

It is possible that the grid-side phase L1 leads the grid-side phase L2 electrically by 120° and also that the grid-side phase L2 leads the grid-side phase L3 electrically by 120° and that the grid-side phase L3 leads the grid-side phase L1 electrically by 120°. However, it is preferably the other way round, so that the grid-side phase L1 lags the grid-side phase L2 electrically by 120° and also that the grid-side phase L2 lags the grid-side phase L3 electrically by 120° and that the grid-side phase L3 lags the grid-side phase L1 electrically by 120°.

Figure 2:
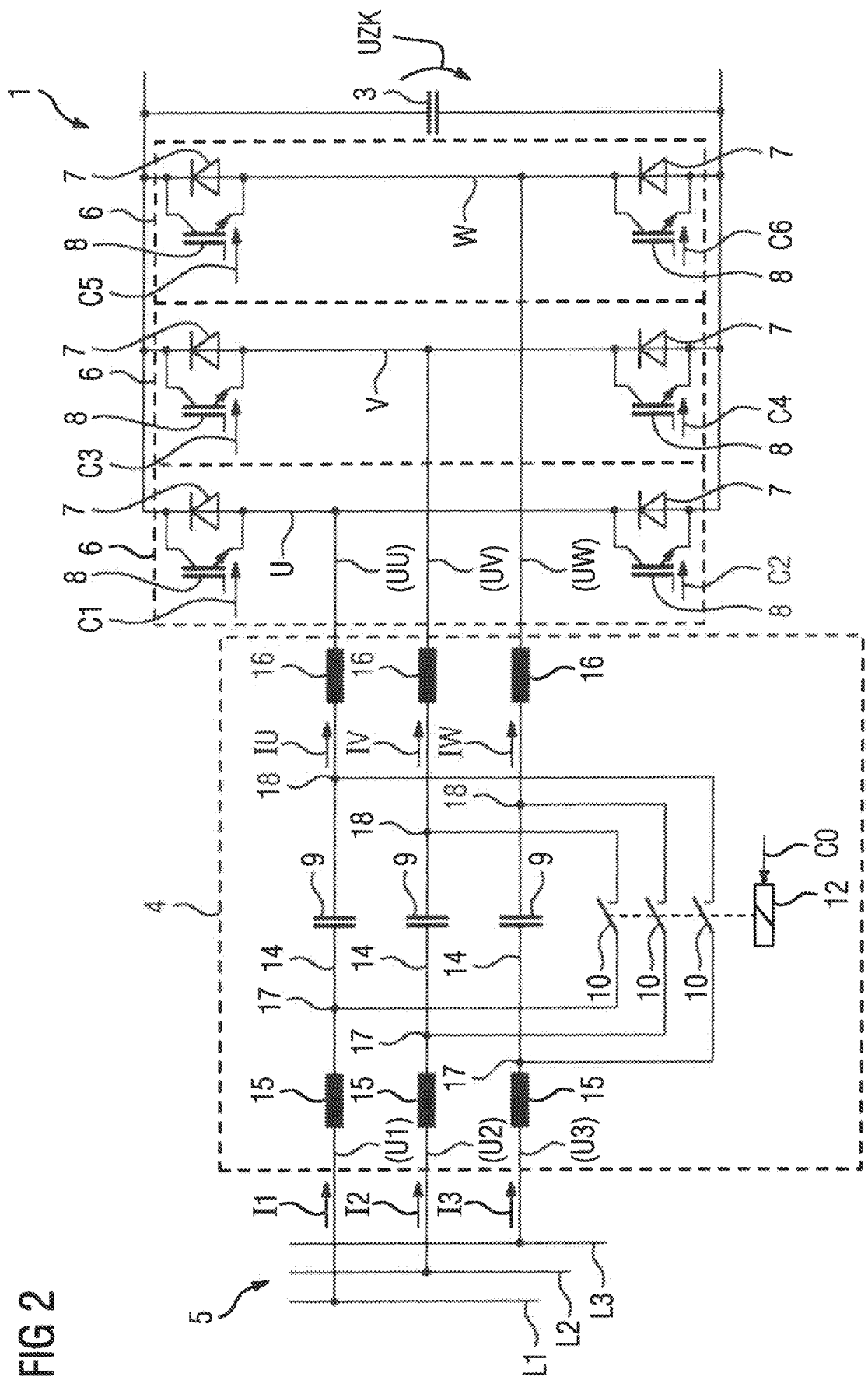
FIG. 2 is a grid interface, a precircuit and an input-side rectifier.

The rectifier 1 accordingly has a plurality of half-bridges 6 according to the representation of FIG 2. By means of each of the half-bridges 6, respectively one of the input-side phases U, V, W of the rectifier 1 feeds the backup capacitor 3. The half-bridges 6 accordingly have diodes 7 according to the representation of FIG 2. Preferably, they also have active switching elements 8 connected in parallel to the diodes 7. The switching elements 8, where they exist, are electronic semiconductor switches, for example, MOSFETs. On the basis of the active switching elements 8, the rectifier 1 is capable of energy recovery. They are actuated, where provided, via corresponding control signals C1 to C6. If the active switching elements 8 are present, it is possible that the diodes 7 are separate components. Alternatively, it is possible that the diodes 7 are integrated components of the active switching elements 8.

According to the representation of FIG. 2, the grid-side phases L1, L2, L3 are each connected within the pre-circuit 4 via a respective capacitor 9 to one of the input-side phases U, V, W. Specifically, the grid-side phase L1 is connected to the input-side phase U, the grid-side phase L2 is connected to the input-side phase V and the grid-side phase L3 is connected to the input-side phase W, respectively via one of the capacitors 9. The capacitors 9 will be denoted below, for linguistic differentiation from the backup capacitor 3, as phase capacitors 9.

Furthermore, the grid-side phases L1, L2, L3 are each connected within the pre-circuit 4 via a respective switch 10 to one of the other input-side phases U, V, W. Specifically, the grid-side phase L1 is connected to the input-side phase V, the grid-side phase L2 is connected to the input-side phase W and the grid-side phase L3 is connected to the input-side phase U, respectively by means of one of the switches 10. The connection of the grid-side phase L1 to the input side phase V, the grid-side phase L2 to the input-side phase W and the grid-side phase L3 to the input-side phase U is direct. If the switch 10 is closed, the grid-side phases L1, L2, L3 are therefore each short-circuited to the input-side phases U, V, W. In this case, the phase capacitors 9 each connect two grid-side phases L1, L2, L3 and/or two input-side phases U, V, W to one another. In particular, connected, in each case via one of the phase capacitors 9, are

- the grid-side phase L1 and the input-side phase V (which in this case are short-circuited to one another via one of the switches 10) to the grid-side phase L2 and the input-side phase W (which in this case are short-circuited to one another via another of the switches 10),
- the grid-side phase L1 and the input-side phase V to the grid-side phase L3 and the input-side phase U (which in this case are also short-circuited to one another via another of the switches 10), and
- the grid-side phase L2 and the input-side phase W to the grid-side phase L3 and the input-side phase U.

The frequency converter of FIG. 1 also has a control apparatus 11. The control apparatus 11 generates, where required, the control signals C1 to C6. The control apparatus 11 keeps the switches 10 open during pre-charging of the backup capacitor 3. By this means, the backup capacitor 3 is slowly charged via the phase capacitors 9. Keeping the switches 10 in the opened state can take place, for example, in that a relay 12 which actuates the switches 10 does not have current applied by the control apparatus 11. However, when a pre-determined charging state Z1—hereinafter designated the first charging state Z1—is reached, the control apparatus 11 closes the switches 10. A corresponding control signal, for example, for the relay 12 is designated C0 in FIG. 2. In this state—that is, with the switches 10 closed—the normal operation of the frequency converter comes about. In normal operation, the further apparatus 2 is also actuated by the control apparatus 11. For example, according to the representation in FIG. 1, a load 13 can be supplied with electrical energy via an inverter, The first charging state Z1 can be defined, for example, in that a support voltage UZK falling across the backup capacitor 3 has reached a pre-determined percentage of its target value, for example, at least 90%.

In FIGS. 1 and 2—in FIG. 2, in particular—not only the basic embodiment of the present invention is shown, but also a series of advantageous embodiments. In particular, the pre-circuit 4 can have inductors 15 in lines 14 to the grid-side phases L1, L2, L3. If the inductors 15 are present, they are preferably arranged in the lines 14 such that phase currents I1, I2, I3 fed in from the supply network 5 (grid-side phase currents I1, I2, I3) flow through them both with the switches 10 open and closed. Alternatively or additionally, the pre-circuit 4 can have inductors 16 in the lines 14 to the input-side phases U, V, W. If the inductors 16 are present, they are preferably arranged in the lines 14 such that the phase currents IU, IV, IW flowing via the half-bridges 6 (input-side phase currents IU, IV, IW) flow through them both with the switches 10 open and closed. Node points 17, 18 at which the switches 10 are connected to the lines 14 are therefore arranged between the phase capacitors 9 and the inductors 15, 16.

Figure 3:
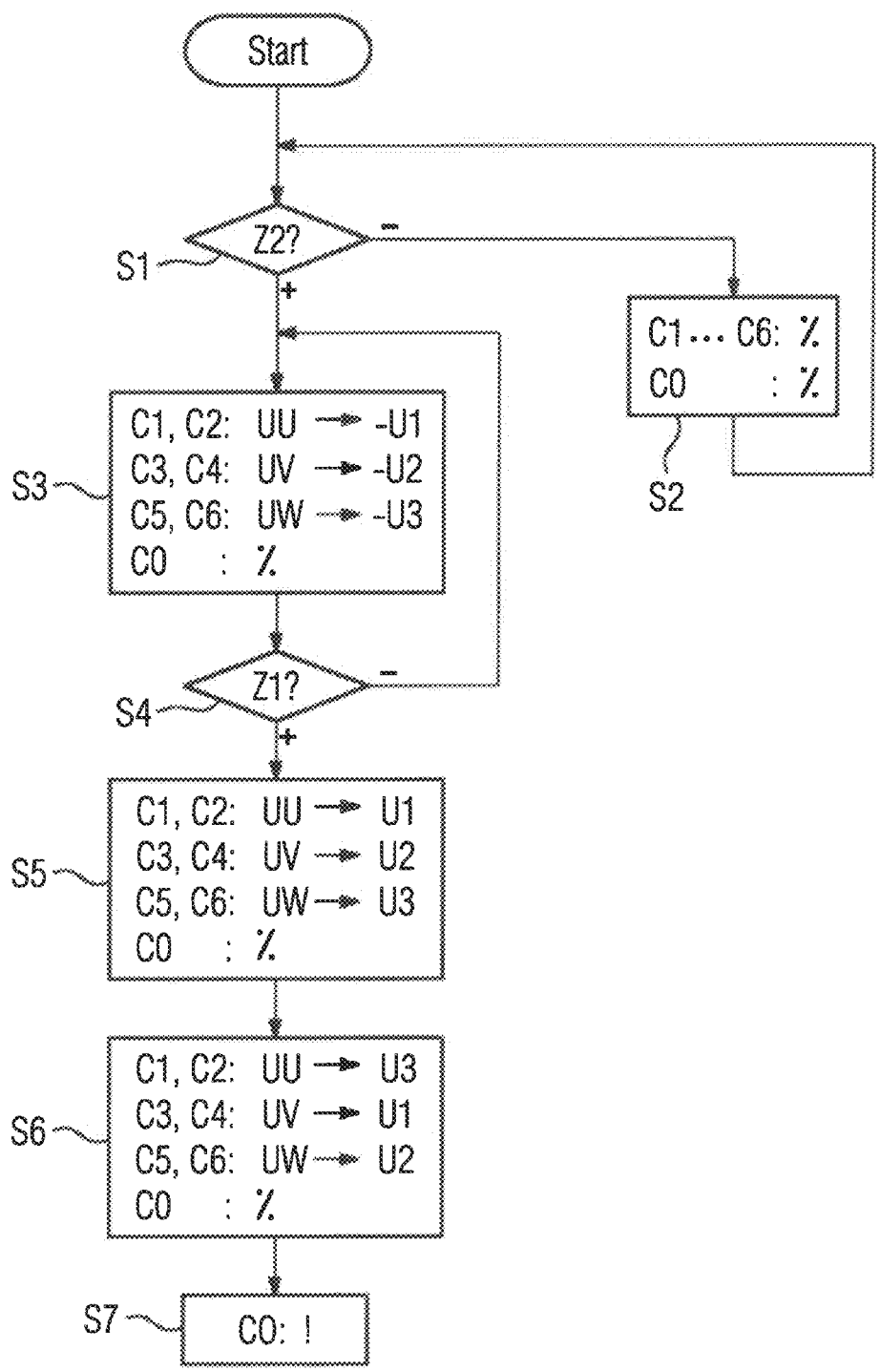
FIG. 3 is a flow diagram.

The operating method of the frequency converter will now be described in greater detail, making reference to FIG. 3. In this regard, two further advantageous embodiments will also be described. These embodiments are firstly realizable independently of one another. Secondly, they are also realizable independently of whether inductors 15, 16 are arranged in the lines 14 or not. However, they both depend upon the active switching elements 8 being present.

Before the principle of the design according to the invention, the first of the two advantageous embodiments will now be described. This is because it is carried out first in the chronological sequence of the measures taken.

In the context of this advantageous embodiment, when the rectifier 1 is connected to the supply network 5 in a step S1, the control apparatus 11 according to FIG. 3 tests whether the backup capacitor 3 reaches a charging state Z2, hereinafter referred to as the second charging state Z2. In particular, the control apparatus 11 can test in step S1 whether the support voltage UZK reaches or exceeds a suitable predetermined value, for example a value of between 30% and 70%, in particular, 40% to 60% of the target value.

If this is not the case, the control apparatus 11 returns via a step S2 to step S1 again. In step S2, the control apparatus 11 keeps both the switches 10 and also the active switching elements 8 open. This is indicated in FIG. 3 in that no output (indicated by the symbol %) of the control signals C0 to C6 takes place.

Figure 4:
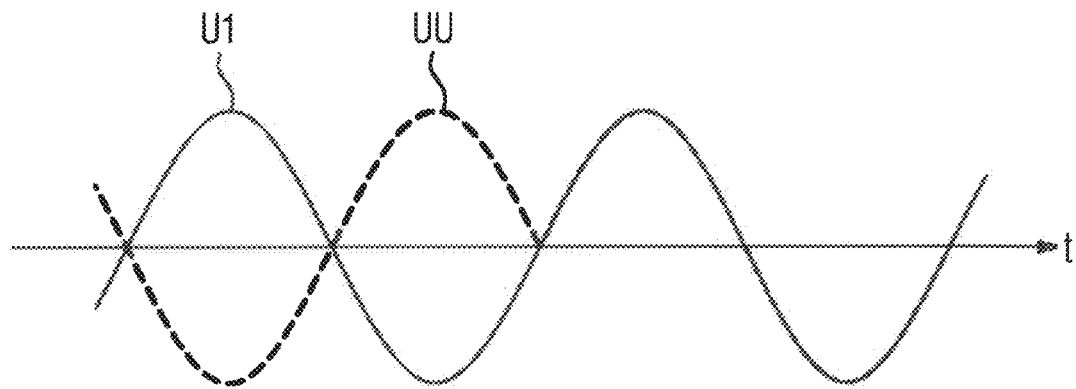
FIG. 4 is a time-based graphical diagram.

When the backup capacitor 3 reaches the second charging state Z2, the control apparatus 11 actuates the active switching elements 8 in a step S3. The actuation is such that an input-side phase voltage UU is fed via the active switching elements 8, by means of which the input-side phase U is switched, to the corresponding phase capacitor 9 which voltage varies contrary (antiphase) to the grid-side phase voltage U1. FIG. 4 shows, on the left side, the associated variation of the grid-side phase voltage U1 and the input-side phase voltage UU as a function of time t.

In a similar way, the control apparatus 11 actuates the active switching elements 8, by means of which the input-side phase V is switched, such that an input-side phase voltage UV is fed to the corresponding phase capacitor 9 which voltage varies contrary (antiphase) to the grid-side phase voltage U2. Similarly, the control apparatus 11 actuates the active switching elements 8, by means of which the input-side phase W is switched, such that an input-side phase voltage UW is fed to the corresponding phase capacitor 9 which voltage varies contrary (antiphase) to the grid-side phase voltage U3. By this means, a relatively large potential difference exists on the phase capacitors 9 so that relatively large phase currents I1, I2, I3, IU, IV, IW flow in the lines 14. The backup capacitor 3 is thereby charged rapidly. Since the grid-side phase voltages U1, U2, U3 change over time, the input-side phase voltages UU, UV, UW also change. The actuation of the active switching elements 8 must match these conditions. However, the corresponding determination of the actuation of the active switching elements 8 is commonly known to persons skilled in the art and therefore need not be described in detail.

Now the basic embodiment according to the invention and in conjunction therewith, the second of the two advantageous embodiments will be described. This is done in combination since the second of the two advantageous embodiments relates to measures which are taken when the first charging state Z1 is reached immediately before the closing of the switches 10.

During the pre-charging of the backup capacitor 3, the second charging state Z2 is attained before the first charging state Z1. The control apparatus 11 therefore tests in step S4 whether the backup capacitor 3 attains the first charging state Z1. In particular, the control apparatus 11 can test in step S4 whether the support voltage UZK reaches or exceeds a suitable predetermined value. This value must be greater than the value that is used for the second charging state Z2.

Figure 5:
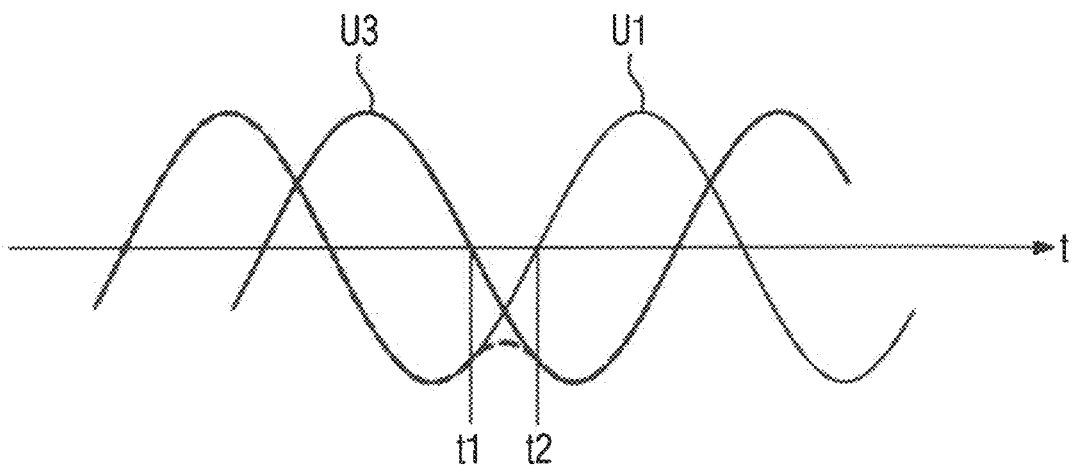
FIG. 5 is a further time-based graphical diagram.

If this is not the case, the control apparatus 11 returns to step S3 again. Otherwise, it transfers to step S5. In step S5, the control apparatus 11 actuates the active switching elements 8 for the phase U such that an input-side phase voltage UU is applied via the associated active switching elements 8 to the input-side phase U, which voltage corresponds in amplitude and phase to the grid-side phase voltage U1, FIG. 4 shows, on its right side, the associated variation of the phase voltage U1 and the phase voltage UU as a function of time t. FIG. 5 also shows, on its left side, the associated variation of the phase voltage U1 and the phase voltage UU as a function of time t.

FIG. 4 also shows how the switching over from the antiphase variation (left side) to the same-phase variation (right side) takes place. This is preferably because, as shown in FIG. 4, the switch-over takes place during a zero-crossing of the phase voltage U1, UU.

In a similar manner, in step S5, the switch-over of the phase voltage UV of the input-side phase V from a variation antiphase to the variation of the phase voltage U2 to a variation in phase with the variation of the phase voltage U2 also takes place. The same applies to the switch-over of the phase voltage UW of the input-side phase W from a variation antiphase to the variation of the phase voltage U3 to a variation in phase with the variation of the phase voltage U3.

Thereafter, in a step S6, the control apparatus 11 actuates the active switching elements 8 for the phase U such that an input-side phase voltage UU is applied via the associated active switching elements 8 to the input-side phase U, which voltage corresponds in amplitude and phase to the grid-side phase voltage U3. Herein, a continuous transformation takes place according to the representation of FIG. 5. This can be achieved in that, according to the representation in FIG. 5, from a time point t1, a particular voltage value of the input-side phase voltage UU is kept constant until the grid-side phase voltage U3 reaches this particular voltage value at a time point t2. After reaching the particular voltage value, the phase voltage UU then follows the grid-side phase voltage U3.

In a similar manner, in step SS, the switch-over of the phase voltage UV of the input-side phase V from a variation in phase with the variation of the phase voltage U2 to a variation in phase with the variation of the phase voltage U1 also takes place. The same applies to the switch-over of the phase voltage UW of the input-side phase W from a variation in phase with the variation of the phase voltage U3 to a variation in phase with the variation of the phase voltage U2.

It is possible to carry out the transformation just described of the phase voltages UU, UV, UW simultaneously. In this case, in particular, it proves to be advantageous if the grid-side phase L1 lags the grid-side phase L2 electrically by 120° and also that the grid-side phase L2 lags the grid-side phase L3 electrically by 120° and that the grid-side phase L3 lags the grid-side phase L1 electrically by 120°. By this means, the respective input-side phase voltage UU, UV, UW must only be kept at a constant value for a third of a period of the grid-side phase voltages U1, U2, U3. Otherwise, the input-side phase voltages UU, UV, UW must be kept at a constant value for two thirds of a period of the grid-side phase voltages U1, U2, U3.

The individual input-side phases U, V, W are controllable via the corresponding half-bridges 6 independently of one another. It is therefore alternatively possible to carry out the transformation just described of the phase voltages UU, UV, UW one after the other. In this case, it is even possible to carry out a direct, immediate (abrupt) switch-over of the input-side phase voltages UU, UV, UW from a variation in phase with one of the grid-side phase voltages U1, U2, U3 to a variation in phase with another of the grid-side phase voltages U1, U2, U3 without causing a voltage jump and thus to carry out the switch-over continuously as before. In this case, however, for example the switch-over for the phase U must take place at a time point at which the grid-side phase voltages U1 and U3 have the same value. In a similar manner in this case, the switch-over for the phase V must take place at a time point at which the grid-side phase voltages U1 and U2 have the same value. Similarly, in this case, the switch-over for the phase W must take place at a time point at which the grid-side phase voltages U2 and U3 have the same value.

After the transformation just described of the phase voltages UU, UV, UW, in a step S7, the control apparatus 11 closes the switch 10. The dosing of the switch 10 should take place as soon as possible after the time point t2, With the dosing of the switch 10, the pre-charging of the backup capacitor 3 and thus of the frequency converter overall is completed. There follows the normal operation in which the further apparatus 2 is operated in the normal manner. In order to close the switches 10, the control apparatus 11 can, for example, actuate the relay 12 such that the switches 10 are closed.

Summarizing, the present invention therefore relates to the following subject matter:

A frequency converter has a rectifier 1 on the input side and at least one backup capacitor 3 arranged downstream of the rectifier 1. The rectifier 1 has a plurality of half-bridges 6, by means of which respectively one of the input-side phases U, V, W of the rectifier 1 feeds the backup capacitor 3. The input-side phases U, V, W are connected via a pre-circuit 4 to grid-side phases L1, L2, L3 of a multiphase supply network 5. The grid-side phases L1, L2, L3 are each connected within the pre-circuit 4 via a respective phase capacitor 9 respectively to one of the input-side phases U, V, W. The grid-side phases L1, L2, L3 are each further directly connected within the pre-circuit 4 via a respective switch 10 to a respective different input-side phase U, V, W, so that with the switches 10 closed, the grid-side phases L1, L2, L3 are short-circuited to the input-side phases U, V, W and the phase capacitors 9 each connect two grid-side phases L1, L2, L3 and/or two input-side phases U, V, W to one another. The frequency converter has a control apparatus 11 which keeps the switches 10 open during pre-charging of the backup capacitor 3 and when a pre-determined charging state Z1 of the backup capacitor 3 is reached, closes them.

The present invention has many advantages. In particular, not only is a low-loss pre-charging of the backup capacitor 3 possible, but the pre-circuit 4 is also significantly simplified. In particular, in comparison with the prior art, pre-charging resistors and pre-charging capacitors required therein can be spared. The frequency converter according to the invention can therefore be realized significantly more economically than frequency converters of the prior art. In particular, the costs of the pre-circuit 4 can be reduced by more than 50% in comparison with the prior art. The capacitance values required for the phase capacitors 9 can be tuned such that both a rapid pre-charging and also a good filtration result.

Although the invention has been illustrated and described in detail with the preferred exemplary embodiment, the invention is not restricted by the examples disclosed and other variations can be derived therefrom by a person skilled in the art without departing from the protective scope of the invention.

What is claimed is:

1. A frequency converter, comprising:
    a rectifier on an input side and a backup capacitor arranged downstream of the rectifier, the rectifier comprising input-side phases and half-bridges, the half-bridges feeding the backup capacitor by the input-side phases;
    a pre-circuit connecting an input-side phase of the rectifier via a phase capacitor to a grid-side phase of a multi-phase supply network, and directly connecting each grid-side phase via a switch to a different input-side phase, and when the switches are closed, the grid-side phases are short circuited to the input-side phases and the phase capacitors each connect two grid-side phases and/or two input-side phases to one another; and
    a control apparatus configured to keep the switches open during pre-harging charging of the backup capacitor and closing the switches when a predetermined first charging state of the backup capacitor is reached.

2. The frequency converter of claim 1, wherein the pre-circuit has inductors in lines to the grid-side phases and/or to the input-side phases.

3. The frequency converter of claim 2, wherein the inductors are arranged in the lines such that phase currents fed in from the supply network and/or flowing via the half-bridges flow through the inductors with both open and closed switches.

4. The frequency converter of claim 1, wherein the half-bridges have active switching elements so that the rectifier is configured as a feedback-capable converter.

5. The frequency converter of claim 4, wherein the control apparatus is configured to:
    when the pre-determined first charging state is reached, firstly actuate the active switching elements such that input-side phase voltages which correspond in amplitude and phase to grid-side phase voltages that exist on the grid-side phases to which the input-side phases are connected via the phase capacitors are applied via the active switching elements to the input-side phases,
    then actuate the active switching elements such that the input-side phase voltages which are applied via the active switching elements to the input-side phases are always transformed into the grid-side phase voltages which exist on the grid-side phases to which the input-side phases are connected via the switches, and
    close the switches only after the transformation of the input-side phase voltages into the grid-side phase voltages which exist on the grid-side phases to which the input-side phases are connected via the switches.

6. The frequency converter of claim 4, wherein the control apparatus is configured to, after reaching a second charging state of the backup capacitor that is attained during the pre-charging of the backup capacitor before the first charging state, actuate the active switching elements such that input-side phase voltages which vary antiphase to grid-side phase voltages that exist on the grid-side phases to which the input-side phases are connected via the phase capacitors are applied via the active switching elements to the input-side phases.

* * * * *

UNITED STATES PATENT AND TRADEMARK OFFICE
CERTIFICATE OF CORRECTION

PATENT NO.           : 11,431,241 B2                              Page 1 of 1
APPLICATION NO.      : 17/290036
DATED                : August 30, 2022
INVENTOR(S)          : Alexander Hensler and Hubert Schierling It is certified that error appears in the above-identified patent and that said Letters Patent is hereby corrected as shown below:

On the Title Page

Item (30) Foreign Application Priority Data:
Replace "18203374" with the correct -- EP 18203374.6 --.

In the Claims

In Column 9, Claim 1, Line 29:
Replace "pre-harging charging" with -- pre-charging --.

Signed and Sealed this
Twenty-second Day of November, 2022

Katherine Kelly Vidal
*Director of the United States Patent and Trademark Office*